US005501435A

United States Patent [19]

Monteiro

[11] Patent Number: 5,501,435

[45] Date of Patent: Mar. 26, 1996

[54] MECHANICAL CAM CLAMP

[76] Inventor: Luciano T. S. Monteiro, c/o Rua Visconde de Inhauma, 476, 09670 Sao Caetano do Sul, Sao Paulo, Brazil

[21] Appl. No.: 363,995

[22] Filed: Dec. 27, 1994

Related U.S. Application Data

[62] Division of Ser. No. 29,663, Mar. 11, 1993, abandoned.

[30] Foreign Applicatin Priority Date

July 16, 1992 [BR] Brazil .................................... 9202708

[51] Int. Cl.$^{6}$ ...................................................... B23Q 3/08

[52] U.S. Cl. ............................. 269/24; 269/32; 269/232; 269/229

[58] Field of Search ................................ 269/24, 32, 27, 269/91, 93, 232, 229

[56] References Cited

U.S. PATENT DOCUMENTS

| | | | |
|---|---|---|---|
| 1,940,278 | 12/1933 | Walker | 269/232 |
| 3,336,022 | 8/1967 | Tridgell | 269/32 |
| 4,225,124 | 9/1980 | Pollak | 269/32 |
| 4,560,152 | 12/1985 | Miller | 269/24 |
| 4,721,293 | 1/1988 | Schron et al. | |
| 4,830,349 | 5/1989 | Miyata | |
| 5,013,015 | 5/1991 | Fatheree | |

FOREIGN PATENT DOCUMENTS

| | | | |
|---|---|---|---|
| 2757507 | 7/1978 | Germany | 269/32 |
| 56-39846 | 4/1981 | Japan | |
| 730532 | 4/1980 | U.S.S.R. | 269/24 |

*Primary Examiner*—Robert C. Watson
*Attorney, Agent, or Firm*—Cushman, Darby & Cushman

[57] ABSTRACT

A cam clamp includes a swing clamp arm and multiple options for driving the clamp. The movement of a locking cam within a clamp header influences a central shaft having a clamp member attached thereto to rotate from a first rest position to a second clamping position, then causes the central shaft (with the clamp member mounted thereon) to move axially downwards to exert a clamping force. In a second embodiment, the rotational movement of a locking ring causes a central shaft, having a clamp member attached thereto, to rotate with it from a first rest position to a second clamping position. At the second position, the shaft is restrained from further rotation, but the locking ring continues as before. An appropriately inclined upper surface of the locking ring comes into sliding contact beneath the clamp member, causing the clamp member to pivot downwards with steadily increasing clamping force.

18 Claims, 7 Drawing Sheets

Fig. 16
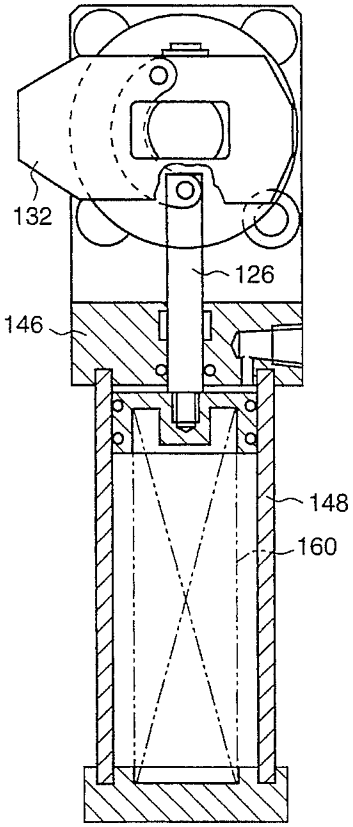
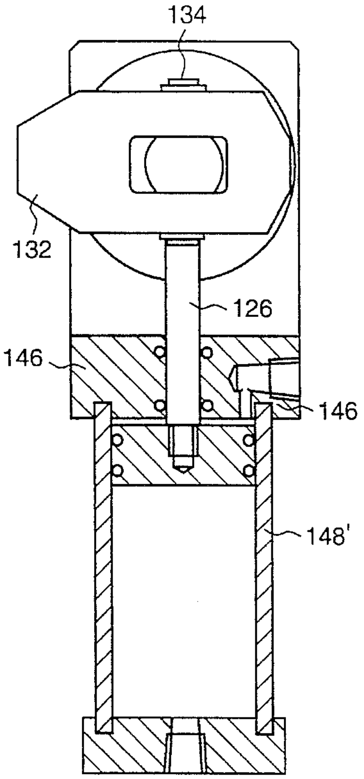
Fig. 17

MECHANICAL CAM CLAMP

This is a division of application Ser. No. 08/029,663, filed on Mar. 11, 1993, which was abandoned upon the filing hereof.

BACKGROUND OF THE INVENTION

1. Field of the Invention

The present invention relates to mechanical, cam-actuated clamping devices, and in particular to such clamping devices provided with a swinging clamp arm which moves from a first release position to a second position where the clamp is actuated to clamp a desired object.

2. Description of Related Art

Several types of clamps for clamping objects such as dies, fixtures, molds, and parts in machining operations are known. Such devices generally use hydraulic power to exert clamping force, but require continuous pressure application to maintain clamping. Some devices, like that disclosed in U.S. Pat. No. 4,721,293, teach the use of a hydraulic mechanism to close the clamp initially, but then uses a self-locking mechanism to eliminate the need for continued hydraulic pressure. JP 56-39846 also uses hydraulic power in combination with a mechanical lock. However, these clamping devices must be located or positioned manually, or by an auxiliary system, thereby increasing their operational change-over time and their cost of manufacture.

To eliminate such inefficiencies, swing clamps with a cam sleeve and/or a cam slot operated pneumatically, hydraulically, or manually are known, such as in U.S. Pat. No. 5,013,015. However, these devices do not exert locking forces as strong as those described above. However, those described previously do not present the benefit of a swinging clamp arm.

A device that provides a swing clamp arm and a strong locking force is disclosed in U.S. Pat. No. 4,830,349. However, it represents a relatively expensive concept and requires continuous pressure from a hydraulic pump for operation, resulting in additional operating costs from continuous operation and maintenance.

SUMMARY OF THE INVENTION

The present invention therefore provides a mechanical clamp with a swinging clamp arm with strong clamping action and without the need for continuous pressure application while clamping is performed.

In addition, such clamping can be activated and deactivated with different driving options, including, but not limited to manual, pneumatic, or hydraulic operation. Each option has operational advantages associated therewith.

The present invention is advantageously simple, reliable, and efficient in operation, and is inexpensive and easy to manufacture.

These and other related objects are realized in a first embodiment by providing a clamp with a swing clamp member which is mounted on a rotatable central shaft within a clamp header. A locking cam with an engaging member, such as a pin member, is also provided within the header, substantially perpendicular to the central shaft. The locking cam has at least one surface which is at least partially inclined. The locking cam can also move in a line within its plane. When the locking cam is moved relative to the central shaft in operation, the engaging member engages the shaft, in a groove provided in the shaft, for example. The continued motion of the locking cam causes the shaft, with the clamp member attached, to rotate from a first position to a second position.

At the second position, the engaging member disengages from the shaft, thus stopping the further rotation of the shaft (and the clamp member). The locking cam continues to move in the same direction beneath and in sliding contact with the shaft, however, and its inclined surface causes the shaft to cause the clamp member to pivot downwards to exert a clamping force as desired. The locking cam is moved in the opposite direction to reverse the process for unclamping an object. The movement of the locking cam is achieved by an auxiliary driving source connected thereto, which can include pneumatic or hydraulic cylinders, mechanical power sources, or manual actuation.

A second embodiment also realizes the same and similar objects. In the second embodiment, a clamp is provided which has a central shaft that is rotatably engaged within a base by means of a flange on the end of the shaft. A clamp member is pivotably mounted on the shaft on the end opposite from the base. A rotatable locking ring is disposed about and is in snug frictional contact with the central shaft and is generally proximal to the base. The locking ring is made to rotate by an auxiliary drive source, including, but not limited to, pneumatic or hydraulic cylinders, mechanical power sources, or manual actuation.

In operation, the locking ring is made to rotate away from a first position by the driving source. Because of the frictional effects between the locking ring and the central shaft, the central shaft (with the clamp member attached thereto) also rotates. The locking ring, and shaft and clamp member continue to rotate together towards a second position, at which point the shaft and clamp member are prevented from further rotation, by a pin member, for example. This overcomes the frictional effects between the locking ring and the shaft and allows the locking ring to continue to rotate in the same direction as before. The surface of the locking ring opposite the base and proximate to the shaft has at least one portion smoothly inclined upwards in a direction away from the base. This inclined surface comes into sliding contact with a portion of the clamp member and forces that portion in a direction away from the base, which in turn causes a portion of the clamp member on the opposite side of the pivot to move downwards to exert the desired clamping force.

Other objects, features, and characteristics of the present invention, as well as methods of operation and function of the related elements of structure, and the combination of parts and economies of manufacture, will become more apparent upon consideration of the following detailed description and the appended claims with reference to the accompanying drawings, all of which form a part of this specification.

BRIEF DESCRIPTION OF THE DRAWINGS

FIGS. 6 through 17 illustrate the second embodiment of the present invention. Finally.

FIG. 1 is a plan view of the invention, partially in section, according to a first embodiment, taken along line 1—1 of FIG. 2.

FIG. 2 is a sectional view taken along line 2—2 of FIG. 1.

FIG. 3 is a sectional view taken along line 3—3 of FIG. 1.

FIG. 4 is sectional view along line 4—4 of FIG. 3.

FIG. 5 is a plan view of the invention according to the first embodiment of the invention showing one possible auxiliary drive source.

FIG. 6 is a plan view of the invention, partially in section, according to a second embodiment, taken along line 6—6 of FIG. 7.

FIG. 7 is a sectional view taken along line 7—7 of FIG. 6.

FIG. 8 is a sectional view taken along line 8—8 of FIG. 6.

FIG. 9 is a plan view of the clamping mechanism according to the second embodiment, taken along line 9—9 of FIG. 10, showing a mechanical link to move the locking ring.

FIG. 10 is an sectional view taken along line 10—10 of FIG. 9.

FIG. 11 is a sectional view taken along line 11—11 of FIG. 9.

FIG. 12 is a sectional view along line 12—12 of FIG. 11, showing a spring action provided to force the locking ring towards the locking direction.

FIGS. 13 through 15 show the operation of the invention according to the second embodiment, using as an illustrative example a mechanical link for moving the locking ring moving from a rest position to a clamping position.

FIG. 16 is a plan view of the invention, partially in section, according to the second embodiment showing a single action cylinder with a spring action as the auxiliary drive source.

FIG. 17 is another plan view of the invention, partially in section, according to the second embodiment showing a double action cylinder as the auxiliary drive source.

FIG. 18 is a plan view of an alternative embodiment of the invention, partially in section and including dual clamp assemblies using as auxiliary drive sources pressurizable cylinders operable from the same pressure source.

FIG. 19 is a side elevation of another alternative embodiment of the present invention, which clamps with even greater pressure.

DETAILED DESCRIPTION OF PREFERRED EMBODIMENTS

Figure 1:
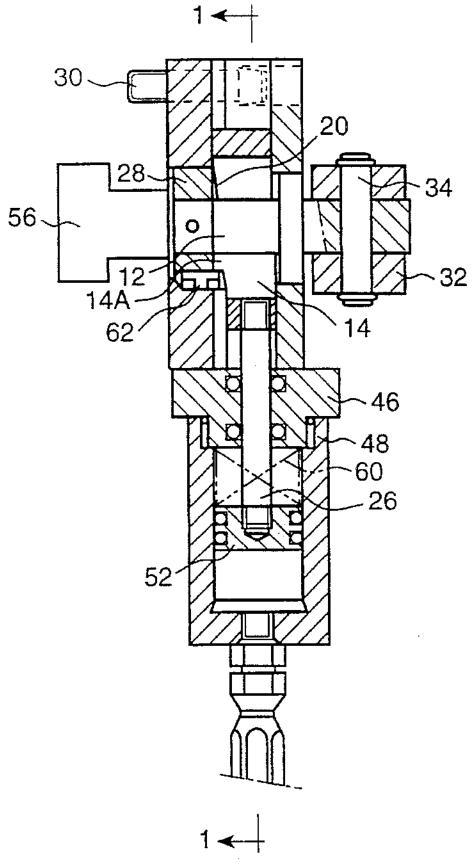
FIGS. 1 through 5 illustrate the first embodiment of the present invention, as noted above.

In the following detailed description of preferred embodiments, like features of the different embodiments will carry the same reference numeral except for a different prefix number common to a particular example.

The First Embodiment

FIGS. 1 through 5 illustrate the present invention, according to a first embodiment. Cam clamp 10 includes a central shaft 12 which is rotatably disposed within clamp header 16. Clamp header 16 is in turn mounted on base 18. Shaft 12 has an opposite cam 20 mounted at one axial end thereof by nut 28 and lock pin 62. A clamp member 32 is mounted at the opposite end of shaft 12, for example by a pin 34. A locking cam 14 is also disposed within clamp header 16 in a plane substantially perpendicular to the longitudinal axis of the central shaft 12. Locking cam 14 has an inclined surface in sliding contact with the opposite cam 20 and is moveable within its plane. The locking cam 14 also includes an engaging member, such as a pin member 22 as illustrated.

In operation, locking cam 14 is made to move by an auxiliary driving source, described below. Through the movement of locking cam 14, the engaging pin 22 is moved to a position where it engages a portion of the central shaft 12. This causes shaft 12 and clamp member 32 attached thereto to rotate away from a first position. The central shaft 12 may be provided with a suitably placed notch or groove structure 12*a* to receive the engaging member 22 to facilitate engagement therebetween, for example.

After a certain rotational distance, the engaging member 22 disengages from the central shaft 12, due to the nature of its line of travel relative to the shaft. Simultaneously, a stop member, such as a stop pin 24, is optionally provided which also acts to prevent further rotation of the central shaft 12. The resultant effect stops the central shaft 12 and clamp member 32 at a second position, shown in phantom in FIG. 4. This second position corresponds to the position where clamping is intended to take place. After the engaging pin 22 disengages from the central shaft, the locking cam 14 on which the engaging pin 22 is mounted continues to move in the same direction, under the influence of the auxiliary driving source.

Hereafter, an inclined portion 14A of locking cam 14 comes into sliding contact with the opposite cam 20. The downward, wedge-like action of the inclined portion 14A against opposite cam 20 causes the nut 28, which is attached to the opposite cam 20, to move axially downwards. Because the nut 28 is attached to the central shaft 12, it in turn causes clamp member 32, mounted at the other end of shaft 12, to likewise move in the same downward direction and exert a clamping force to clamp work piece 40 onto a work bench 42 as desired.

Clamp release is achieved by simply reversing the process (i.e., by the reverse movement of the locking cam 14), whereby the clamping force is removed and the clamp member 32 is rotated by the central shaft 12 back to the first release position.

If necessary or desirable, the clamp according to the first embodiment of the present invention may be modified such that the clamp member 32 does not rotate about the axis of the central shaft 12. However, the remaining features of the clamp according to the first embodiment, as described above, would remain identical.

The Second Embodiment

Figure 6:
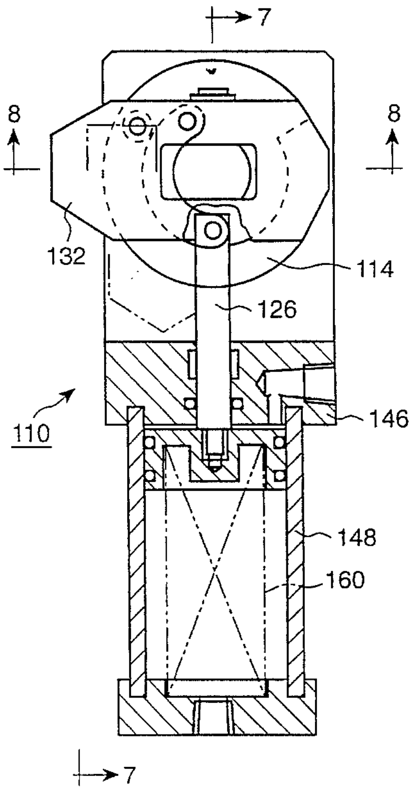
Figure 7:
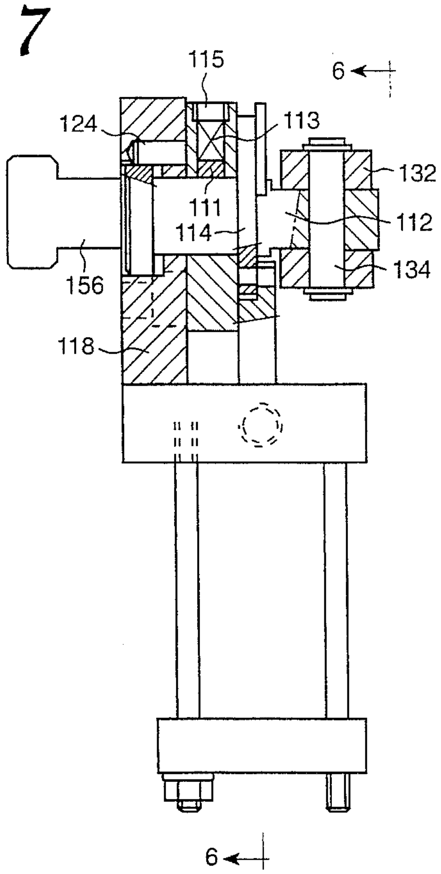
Figure 8:
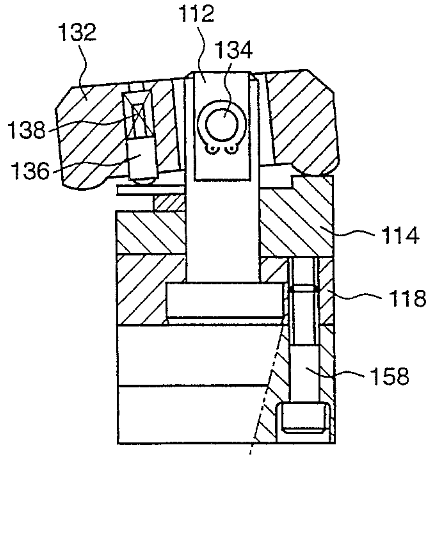
Figure 9:
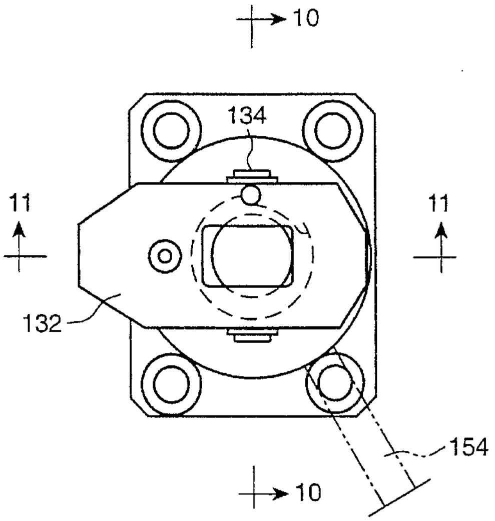
Figure 10:
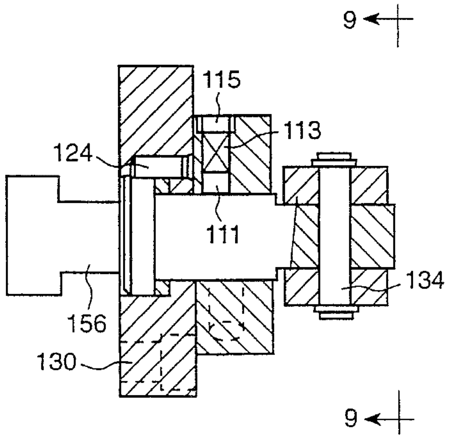
Figure 11:
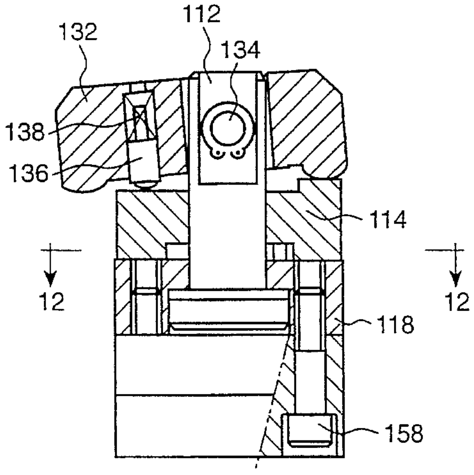
Figure 12:
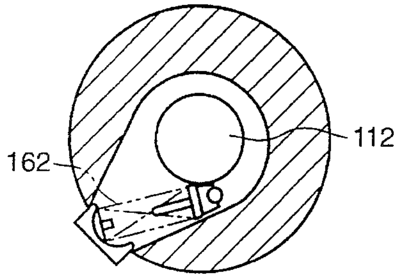

The invention according to a second embodiment is illustrated in FIGS. 6 through 17 which includes several species: 1) FIGS. 6–8; 2) FIGS. 9–15; 3) FIG. 16; and 4) FIG. 17.

Cam clamp 110 comprises a central shaft 112 with a flange mounted on an axial end thereof. The flange of shaft 112 is rotatably disposed within a base 118 of the clamp. A clamp member 132 is pivotably mounted at the other axial end of shaft 112 by a pivot pin 134. In addition, a rotatable locking ring 114 is provided which encircles and contacts shaft 112. A surface of locking ring 114 facing in the direction of the clamp member 132 has a least one flat portion 114*a*, which is substantially parallel to the base 118. Portion 114*a* is smoothly followed by at least one inclined portion 114*b* (see FIGS. 13–15) which is canted away from the base 118. Surface 114*a* of the locking ring 114 can be in contact with or in close proximity to the clamp member 132. A stop member 124, such as a pin, is provided in the base 118 to restrain the movement of shaft 112, with clamp member 132 attached thereto, to a certain range of rotational travel.

Figure 13:
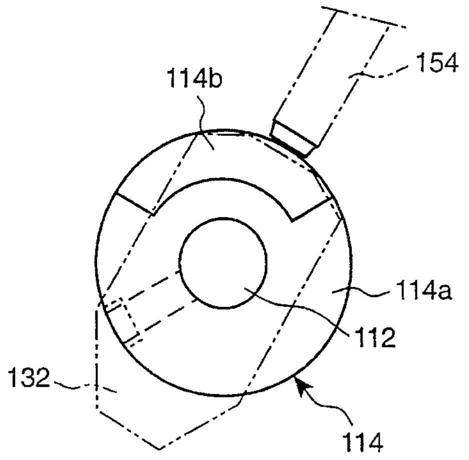
Figure 14:
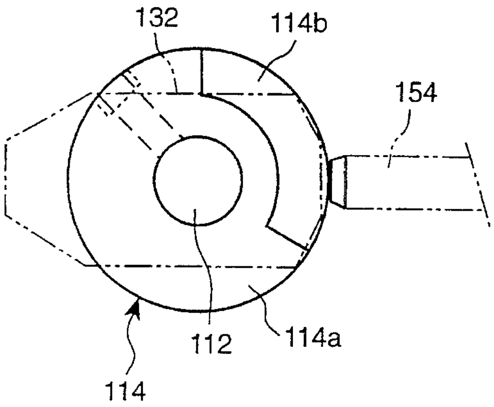
Figure 15:
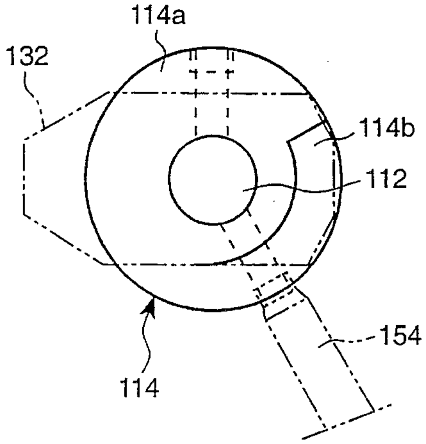

Besides FIGS. 6–11, the operation is now explained in relation to FIGS. 13–15, in sequence. Locking ring 114 is rotated by an auxiliary driving source, which can be one of any number of different types of mechanisms including manually (i.e., hand-operation with, for example, a removable lever member 154 as in FIG. 9), as with the first embodiment, and is discussed below. During an initial period, the locking ring 114 causes the central shaft 112 to rotate with it, due to frictional effects therebetween. If needed, a friction-increasing feature 111 may be provided therebetween, such as mutually opposed rough surfaces. In addition, or in the alternative, a spring action 113 held in place by spring retainer 115 may be provided also to ensure frictional contact between the locking ring 114 and the shaft 112.

After a certain arclength of rotation or "swing", (which corresponds to the flat portion of the locking ring 114*a* discussed above), the stop member 124 prevents further rotation of the central shaft 112. Thus, the central shaft 112, and therefore the clamp member 132, come to rest at a position corresponding to the location where the clamping action is desired to take place.

After the central shaft 112 is prevented from further rotation, the locking ring 114 continues to rotate relative to the central shaft 112, having overcome frictional interaction therebetween. The locking ring 114 rotates to a point where the inclined portion of its surface 114*b* begins to slide beneath one portion of clamp member 132 to force that portion increasingly upwards with respect to base 118. This in turn causes a portion of clamp member 132 on the opposite side of the pivot pin 134 to be forced downwards, resulting in clamping force as desired.

Clamp release is accomplished simply be counterrotating the locking ring 114, whereby clamping force is removed and the clamp member 132 is rotated back to its first position.

If necessary or desirable, the clamp according to the second embodiment of the present invention may be modified such that the clamp member 132 does not rotate about the axis of the central shaft 112. However, the remaining features of the clamp according to the second embodiment, as described above, would remain identical.

Auxiliary Drive Sources

The invention according to the embodiments is operated by an auxiliary drive source of any of several types, including, but not limited to, pneumatic or hydraulic cylinders, mechanical power sources, or manual actuation. Each has operational advantages associated with it. For example, manual actuation eliminates the need for connection to an external power source. Pressurized cylinders or a mechanical source allow for automated and/or remote operation of the clamp.

Figure 2:
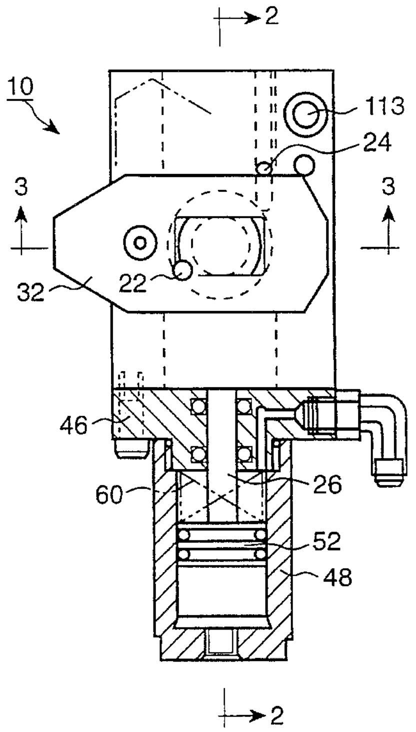

In the first embodiment as shown in FIGS. 1 and 2, a pressurized piston cylinder 48 is used as an example. The base 46 of cylinder 48 is connected with the clamp 10. In operation, in general, the piston 52 is connected by cylinder shaft 26 to the locking cam 14. Thus, when cylinder 48 is pressurized and de-pressurized, it causes piston 52 to move locking cam 14 with shaft 26, as described above.

However, for added safety, the clamping action can be achieved by using a steel or gas spring action 60, which assuredly tends to act in a direction to accomplish clamping (i.e., clamp closure). The auxiliary drive source is then used only for the unclamping action. This arrangement helps to prevent accidental loss of clamping force due to physical separation of pressure lines or loss of pressure therein. Locking spring action 162, seen in FIG. 12, functions in a supplementary manner with respect to forcing locking ring 114 towards a position where a clamping force is exerted.

Figure 5:
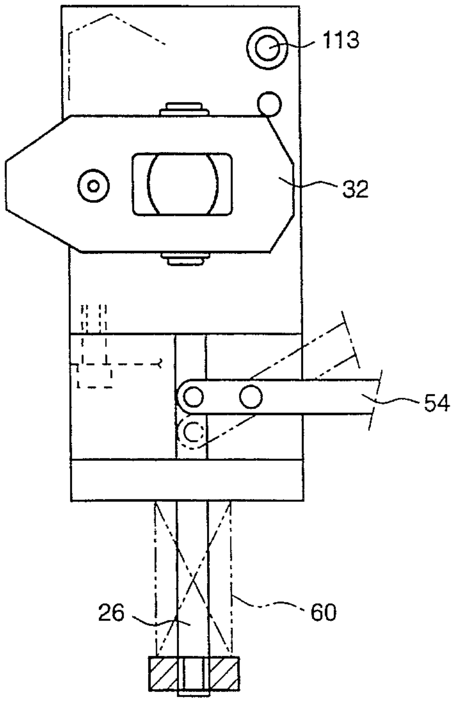

In addition, FIG. 5 shows a link 54 for operating shaft 26 either mechanically or manually, in conjunction with spring action 60.

FIGS. 6–8 show a similar auxiliary drive source for the second embodiment, with a combination of a pressurizable cylinder 148, connected to locking ring 114 by shaft 126, with spring action 160. Specifically, shaft 126 is connected by a pivot pin connection 147 to a first end of curved pivot member 151. The other end of pivot member 151 is connected by another pivot pin connection 149 to the locking ring 114. Further, FIGS. 9 and 13–15 show locking ring 114 being rotated by a link 154, either mechanically or manually. Finally, FIGS. 16 and 17 show the second embodiment operated by locking spring mechanism 160 and single action cylinder 148, and a double action cylinder 148', respectively.

Figure 20A:
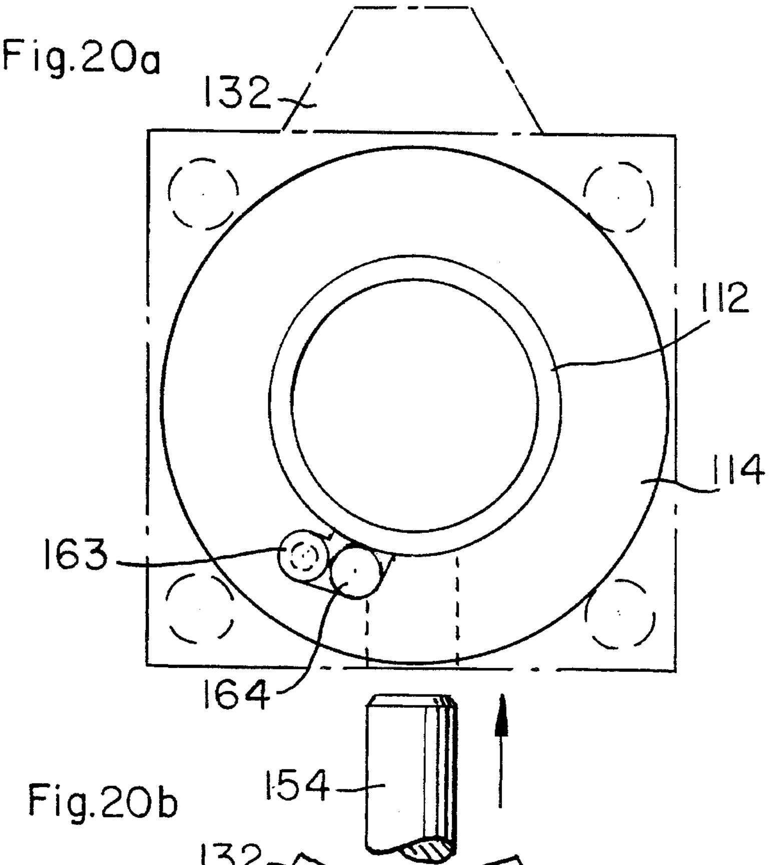
FIGS. 20*a* and 20*b* illustrate a supplemental locking action which can be provided in the second embodiment of the present invention.
Figure 20B:
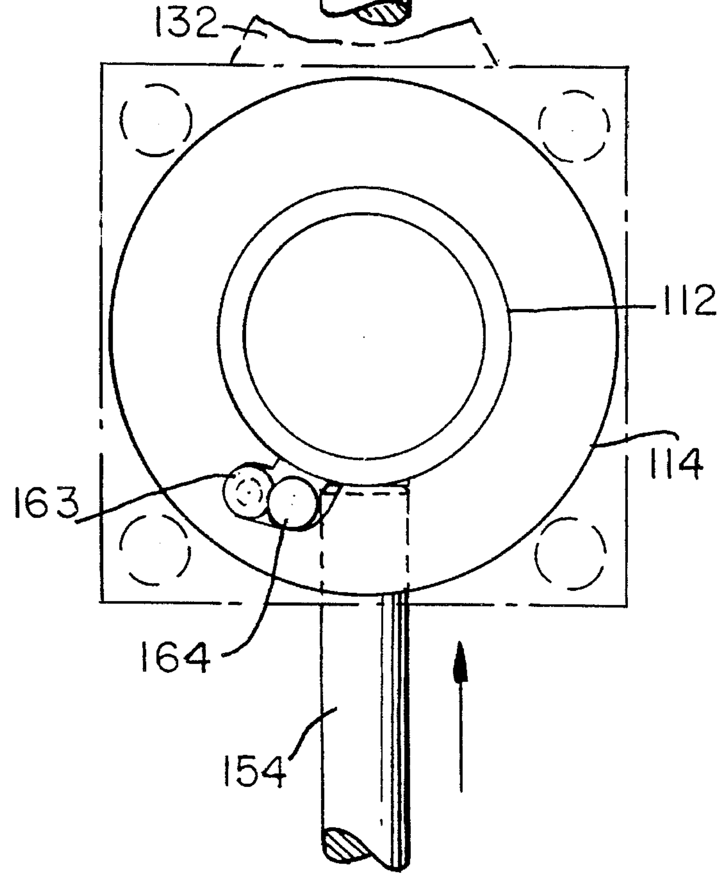

A variation of the spring action 162 is the locking system illustrated in FIGS. 20*a* and 20*b*. A radially expansible spring action 163 and locking member 164 are provided, e.g., in a recess in locking ring 114, wherein the spring action 163 presses locking member 164 against the central shaft 112 and locking ring 114, thus creating an additional locking force therebetween to help hold the central shaft fixed relative to the locking ring 114. In particular, when the locking member 164 is in the position shown in FIG. 20*a*, it prevents the locking ring 114 from rotating in a direction for unclamping. When link 154 is inserted to rotate the locking ring 114 (in either direction), the end of link 154 presses the locking member back against the spring action 163 and away from simultaneous contact with the locking ring 114 and the central shaft 112. Rotation in either direction (i.e., towards clamping or towards unclamping) is thus made possible.

Figure 3:
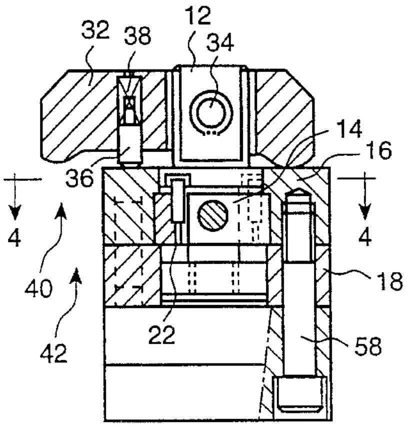
Figure 4:
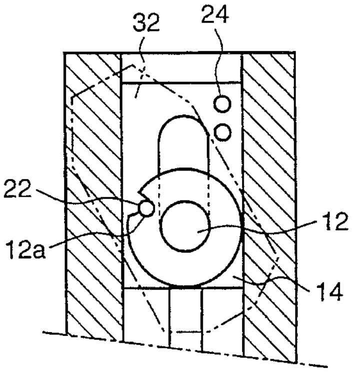

A feature which can be used with both the first and second embodiments is a structure within the clamp member to assist in the unclamping process, such as plungers 36, 136 which act under the influence of springs 38, 138, respectively (see, for example, FIGS. 3 and 8). As can easily be seen due to its orientation, the plunger is pressed by the spring against the clamp header 16 (in the first embodiment) or the locking ring 11 (in the second embodiment). This causes a small restoring force (i.e., less than the clamping force) which acts opposite to the clamping force to assist in pushing the clamp member 32,132 away from the work piece when clamping action is no longer desired. In addition, the plunger beneficially increases friction between the central shaft 112 and the locking ring 114.

The cam clamp, as described in these or in any other embodiment, can be mounted, to a workbench or worktable 42 (see FIG. 3), for example, in any known manner, such as screws 30 or T-blocks 56, 156 fixed to the clamp base by screws 58, 158 and inserted into T-slots.

Figure 18:
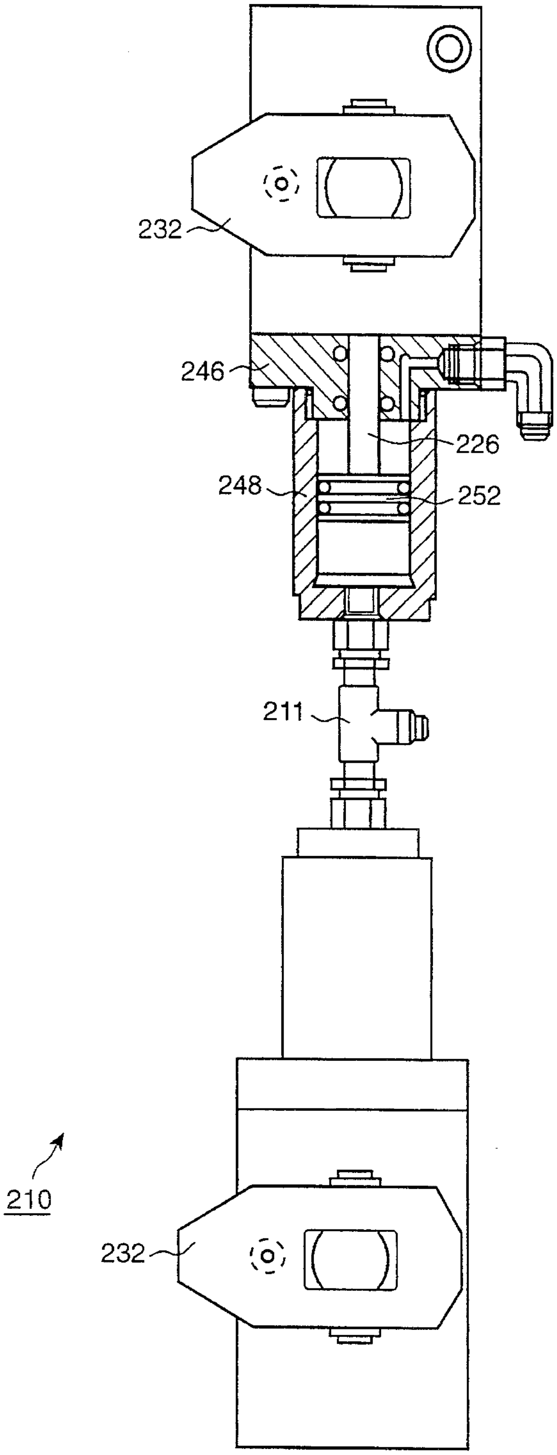
FIGS. 18 and 19 illustrate additional alternative embodiments. It is emphasized that these embodiments are illustrative and should not be construed as limiting the scope of the invention.

Other embodiments of the invention are certainly possible. For example, FIG. 18 shows a double clamp assembly 210 driven by dual piston cylinders 248, 248 which are actuated from a unified pressure source 211 therebetween. In another arrangement (not shown), the auxiliary driving source can be oriented at any angle with respect to the clamp, seen from a top plan view.

Figure 19:
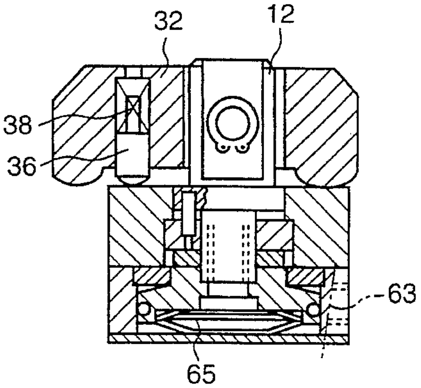

Certain applications may require greater clamping force than available through the first or second embodiments described above. In such instances, motive force from a suitable source is applied directly to the central shaft 12, 112 in addition to the locking cam 14 or locking ring 114. In this manner, greater clamping force is achieved compared to the application of force only on the locking cam 14 or locking ring 114. FIG. 19 illustrates an alternative whereby motive force is exerted directly to the central shaft 12, (or central shaft 112 of the second embodiment, not shown), by pressure from pressure port 63 for example, in addition to the locking cam 14 (or locking ring 114, not shown) in a direction to cause a clamping force to be exerted. Thus, in such an example, the clamping force exerted to the action of the locking cam 14 is increased by the application of additional force directly to the central shaft 12 (or 112). Dish springs 65 are used to provide the return of the central shaft, as seen in FIG. 19.

While the invention has been described in connection with what is presently considered to be the most practical and preferable embodiments, it is to be understood that the invention is certainly not limited to these disclosed embodiments, but, on the contrary, is intended to cover various modifications and equivalent arrangements included within the spirit and scope of the appended claims. Of particular note, the clamp according to the first and second embodiments of the present invention may be modified, if necessary or desirable, such that clamp members 32, 132 do not rotate about central shafts 12, 112. However, the remaining features of the respective embodiments would still be present, as described above.

What I claim is:

1. A cam clamp comprising:

(a) a base;

(b) a central shaft having a longitudinal axis and a flange at one axial end, said flange being rotatably engaged within said base, and said shaft being rotatable about said longitudinal axis;

(c) a clamp member pivotably mounted on said central shaft at an axial end opposite said axial end having said flange;

(d) a locking ring rotatably disposed about and in frictional contact with said central shaft, on top of said base and adjacent to said clamp member;

(e) means for manually rotating said locking ring; and (f) stop means for preventing the rotation of said central shaft beyond a certain arclength of travel.

2. A cam clamp according to claim 1, wherein said certain arclength of travel is between a first clamp position where no clamping force is exerted by said clamp member, and a second clamp position, spaced rotationally apart from said first clamp position, where clamping force is exerted.

3. A cam clamp according to claim 1, wherein said stop means prevents said central shaft from rotating beyond said second clamp position.

4. A cam clamp according to claim 1, wherein the surface of said locking ring opposite said base and proximate to said clamp member has at least one flat portion substantially parallel to said base which is smoothly followed by an inclined portion which is canted away from said base.

5. A cam clamp according to claim 1, such that the rotation of said locking ring causes said central shaft to rotate also due to said frictional contact therebetween.

6. A cam clamp according to claim 5, wherein said frictional contact is overcome when said stop means prevents said central shaft from further rotation, thereby allowing said locking ring but not said central shaft to rotate.

7. A cam clamp according to claim 5, including means for increasing friction to enhance said frictional effects between said locking ring and said central shaft.

8. A cam clamp according to claim 1, wherein said clamp member includes deformable spring means for providing a restoring force counteracting said clamping force exerted by said clamp member in operation, said restoring force thereby forcing said clamp member against said locking ring and facilitating the release of said clamp member from an object being clamped when said clamping force is no longer applied, said spring means additionally acting to increase frictional contact between said shaft and said locking ring.

9. A cam clamp according claim 1, further comprising radially expansible spring means operatively coupled with a locking member, wherein said radially expansible spring means forces said locking member against said locking ring and said central shaft, thereby at least restraining relative movement between the locking ring and the central shaft.

10. A cam clamp comprising:

(a) a central shaft having a longitudinal axis, said shaft being rotatable thereabout between predetermined first and second rotational positions;

(b) a clamp member mounted on an end of said central shaft;

(c) means for rotating said central shaft between said first and second rotational positions; and (d) means for actuating said clamp member for exerting clamping force at said second position, said clamping force being maintainable without external force being continuously applied therefor.

11. A cam clamp according to claim 10, wherein said clamp member is pivotably mounted on said central shaft, and wherein rotating means and said clamp actuating means include a rotatable locking ring disposed about said central shaft and in frictional contact therewith, said locking ring being adjacent to said clamp member and being manually rotatable.

12. A cam clamp according to claim 11, wherein said locking ring has a surface proximate to said clamp member, said surface having at least one portion which lies in a plane substantially perpendicular to said longitudinal axis which is smoothly followed by an inclined portion which is canted towards said clamp member.

13. A cam clamp according to claim 11, wherein rotation of said locking ring also causes said central shaft to rotate due to said frictional contact between said locking ring and said central shaft.

14. A cam clamp according to claim 13, wherein said frictional contact is overcome when said stop means prevents said central shaft from further rotation, thereby allowing said locking ring but not said central shaft to rotate.

15. A cam clamp according to claim 13, including means for increasing friction to enhance said frictional effects between said locking ring and said central shaft.

16. A cam clamp according to claim 13, wherein said clamp member includes deformable spring means for providing a restoring force counteracting said clamping force exerted by said clamp member in operation, said restoring force thereby forcing said clamp member against said locking ring and facilitating the release of said clamp member from an object being clamped when said clamping force is no longer applied.

17. A cam clamp comprising:

(a) a central shaft having a longitudinal axis, said shaft being rotatable about said longitudinal axis;

(b) a clamp member pivotably mounted on said central shaft at an axial end thereof;

(c) a locking ring rotatably disposed about and in frictional contact with said central shaft, adjacent to said clamp member;

(d) means for manually rotating said locking ring; and (e) stop means for preventing the rotation of said central shaft beyond a certain arclength of travel.

18. A cam clamp comprising:

(a) a base;

(b) a central shaft having a longitudinal axis and having one axial end thereof mounted in said base;

(c) a clamp member pivotably mounted on said central shaft at an axial end opposite said axial end having said flange;

(d) a locking ring rotatably disposed about said central shaft, on top of said base and adjacent to said clamp member, said locking ring having an upper surface proximate to said clamp member having at least one portion thereof which is inclined away from said base towards said clamp member;

(e) means for manually rotating said locking ring.

* * * * *